(12) United States Patent
Suzuki

(10) Patent No.: US 7,726,429 B2
(45) Date of Patent: Jun. 1, 2010

(54) FUEL CELL VEHICLE HAVING SUPPORT FRAME WHICH COUPLES SIDE FRAMES IN WIDTH DIRECTION OF VEHICLE

(75) Inventor: Hiroyoshi Suzuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 622 days.

(21) Appl. No.: 11/702,823

(22) Filed: Feb. 6, 2007

(65) Prior Publication Data

US 2007/0215397 A1 Sep. 20, 2007

(30) Foreign Application Priority Data

Mar. 16, 2006 (JP) .............................. 2006-072882

(51) Int. Cl.
*B60K 5/00* (2006.01)
*B60K 1/04* (2006.01)
*B60L 11/18* (2006.01)

(52) U.S. Cl. .................................. 180/232; 180/65.31

(58) Field of Classification Search ............. 180/65.31, 180/232; 429/34; *B60K 1/04; B60L 11/18; H01M 8/04*
See application file for complete search history.

(56) References Cited

U.S. PATENT DOCUMENTS

| | | | | | |
|---|---|---|---|---|---|
| 5,076,389 | A | * | 12/1991 | Goor | 180/232 |
| 5,178,230 | A | * | 1/1993 | Goor | 180/232 |
| 5,213,179 | A | * | 5/1993 | Goor | 180/232 |
| 5,335,745 | A | * | 8/1994 | Goor | 180/232 |
| 5,605,353 | A | * | 2/1997 | Moss et al. | 280/784 |
| 5,641,031 | A | * | 6/1997 | Riemer et al. | 429/13 |
| 5,662,184 | A | * | 9/1997 | Riemer et al. | 180/65.1 |
| 5,740,876 | A | * | 4/1998 | Shimose et al. | 180/232 |
| 5,915,494 | A | * | 6/1999 | Matsumura et al. | 180/232 |
| 5,992,555 | A | * | 11/1999 | Sakamoto et al. | 180/232 |
| 6,223,843 | B1 | * | 5/2001 | O'Connell et al. | 180/65.22 |
| 6,371,229 | B1 | * | 4/2002 | Kakiuchi | 180/65.25 |
| 6,443,253 | B1 | * | 9/2002 | Whitehead et al. | 180/68.1 |
| 6,494,286 | B2 | * | 12/2002 | Shimizu et al. | 180/299 |

(Continued)

FOREIGN PATENT DOCUMENTS

JP 08-192639 7/1996

(Continued)

*Primary Examiner*—Paul N Dickson
*Assistant Examiner*—Jacob Meyer
(74) *Attorney, Agent, or Firm*—Carrier, Blackman & Associates, P.C.; Joseph P. Carrier; William D. Blackman

(57) ABSTRACT

A fuel cell vehicle includes: a motor chamber provided in a front part of the vehicle; side frames extending on right and left sides of the vehicle in a front-to-back direction of the vehicle; a fuel cell; a motor for driving the vehicle, wherein the motor is driven using electric power generated by the fuel cell, and the fuel cell, the motor, and the side frames are installed in the motor chamber; and a support frame for coupling rear portions of the side frames with each other in a width direction of the vehicle, and for supporting the fuel cell installed on the support frame, wherein the motor is arranged below the support frame. The fuel cell vehicle may further include a guide member for guiding the motor toward a lower-back side of the support frame when a front collision of the vehicle occurs.

6 Claims, 5 Drawing Sheets

U.S. PATENT DOCUMENTS

| | | | |
|---|---|---|---|
| 6,819,066 B2 * | 11/2004 | Ishikawa et al. | 318/139 |
| 6,994,178 B2 * | 2/2006 | Mizuno | 429/13 |
| 7,114,586 B2 * | 10/2006 | Uozumi | 180/68.1 |
| 7,144,039 B2 * | 12/2006 | Kawasaki et al. | 280/784 |
| 7,303,211 B2 * | 12/2007 | Borroni-Bird et al. | 280/831 |
| 7,358,003 B2 * | 4/2008 | Imaseki et al. | 429/28 |
| 7,368,197 B2 * | 5/2008 | Horii et al. | 429/26 |
| 7,380,829 B2 * | 6/2008 | Kishima | 280/781 |
| 7,393,016 B2 * | 7/2008 | Mitsui et al. | 280/784 |
| 7,445,076 B2 * | 11/2008 | Shigematsu | 180/299 |
| 7,533,748 B2 * | 5/2009 | Miyajima et al. | 180/68.5 |
| 7,559,389 B2 * | 7/2009 | Yamashita | 180/65.1 |
| 2002/0100622 A1 * | 8/2002 | Shimizu et al. | 180/65.1 |
| 2002/0189873 A1 * | 12/2002 | Mizuno | 180/65.3 |
| 2003/0070858 A1 * | 4/2003 | Kondo | 180/291 |
| 2003/0108784 A1 * | 6/2003 | Enjoji et al. | 429/34 |
| 2004/0060750 A1 * | 4/2004 | Chernoff et al. | 180/65.1 |
| 2004/0090085 A1 * | 5/2004 | Kawasaki et al. | 296/187.09 |
| 2004/0108151 A1 * | 6/2004 | Guidry et al. | 180/65.3 |
| 2004/0149500 A1 * | 8/2004 | Chernoff et al. | 180/65.1 |
| 2005/0133283 A1 * | 6/2005 | Horii | 180/65.1 |
| 2005/0173170 A1 * | 8/2005 | Miyajima et al. | 180/68.5 |
| 2005/0230164 A1 * | 10/2005 | Uozumi | 180/89.1 |
| 2006/0024542 A1 * | 2/2006 | Uozumi et al. | 429/22 |
| 2006/0040160 A1 * | 2/2006 | Horii et al. | 429/34 |
| 2006/0061081 A1 * | 3/2006 | Kresse et al. | 280/834 |
| 2006/0278452 A1 * | 12/2006 | Shimizu et al. | 180/68.3 |
| 2006/0289224 A1 * | 12/2006 | Ono et al. | 180/311 |
| 2007/0007054 A1 * | 1/2007 | Nakashima et al. | 180/65.1 |
| 2007/0007060 A1 * | 1/2007 | Ono et al. | 180/65.3 |
| 2008/0073133 A1 * | 3/2008 | Winter et al. | 180/65.3 |
| 2008/0142289 A1 * | 6/2008 | Yang et al. | 180/299 |
| 2008/0149410 A1 * | 6/2008 | Yang et al. | 180/291 |
| 2008/0166607 A1 * | 7/2008 | Muramatsu et al. | 429/22 |
| 2008/0173489 A1 * | 7/2008 | Takasaki | 180/68.5 |
| 2008/0230288 A1 * | 9/2008 | Shiomi et al. | 180/65.3 |
| 2008/0236924 A1 * | 10/2008 | Horii et al. | 180/220 |
| 2008/0283316 A1 * | 11/2008 | Ono et al. | 180/68.5 |
| 2009/0021052 A1 * | 1/2009 | Kato | 296/203.01 |
| 2009/0058065 A1 * | 3/2009 | Park | 280/830 |
| 2009/0058142 A1 * | 3/2009 | Park | 296/193.07 |
| 2009/0058144 A1 * | 3/2009 | Park | 296/204 |
| 2009/0058145 A1 * | 3/2009 | Park | 296/204 |
| 2009/0102220 A1 * | 4/2009 | Oshio et al. | 296/39.1 |
| 2009/0183936 A1 * | 7/2009 | Kim et al. | 180/68.4 |

FOREIGN PATENT DOCUMENTS

| | | |
|---|---|---|
| JP | 2003-182378 | 7/2003 |
| JP | 2004-122972 | 4/2004 |

* cited by examiner

FUEL CELL VEHICLE HAVING SUPPORT FRAME WHICH COUPLES SIDE FRAMES IN WIDTH DIRECTION OF VEHICLE

BACKGROUND OF THE INVENTION

1. Field of the Invention

The present invention relates to a front structure of a fuel cell vehicle.

Priority is claimed on Japanese Patent Application No. 2006-072882, filed Mar. 16, 2006, the content of which is incorporated herein by reference.

2. Description of the Related Art

Recently, fuel cell vehicles have been developed. The fuel cell vehicle has a fuel cell for generating electric power due to an electrochemical reaction between hydrogen as a fuel gas and oxygen as an oxidant gas, and runs by driving a motor using the generated power.

In such a fuel cell vehicle, structural elements of the fuel cell are disposed under the floor in a central part of the vehicle, so as to provide safety in consideration of a vehicle collision (see, for example, Japanese Unexamined Patent Applications, First Publications Nos. 2004-122972 and 2003-182378). However, when arranging the fuel cell and the like under the floor of the vehicle, the total height of the vehicle is increased, or the height of the interior of the vehicle needs to be decreased. Therefore, it is difficult to use a common frame (or platform) with vehicles employing an internal combustion engine. In addition, restrictions also occur in terms of design or convenient use of the vehicle, so that it is difficult to design or develop a vehicle suitable for individual use, and thus improvement with respect to such a problem has been required.

In consideration of the above situation, Japanese Unexamined Patent Application, First Publication No. H08-192639 discloses a structure for installing the fuel cell in a front portion of an electric vehicle. In this structure, when a vehicle collision occurs, an energy absorption part of a side frame member is deformed so as to bend and protrude upward, and a storage case which contains the fuel cell is also bent and deformed toward the same direction as that of the energy absorption part. Accordingly, the fuel cell is divided into two parts along the center layer in the stack structure of the fuel cell, so that it is ruptured and absorbs part of the collision energy.

However, in the structure disclosed in H08-192639, the fuel cell is positively deformed so as to allow the side frame to absorb the collision energy, which may cause hydrogen leakage from the fuel cell or high-voltage current leakage. Therefore, it is difficult to provide safety with respect to a vehicle collision.

SUMMARY OF THE INVENTION

In light of the above circumstances, an object of the present invention is to provide a fuel cell vehicle for providing safety with respect to a vehicle collision.

Therefore, the present invention provides a fuel cell vehicle comprising:

a motor chamber (e.g., a motor chamber 102 in an embodiment explained later) provided in a front part of the vehicle;

side frames (e.g., side frames 50 in the embodiment) extending on right and left sides of the vehicle in a front-to-back direction of the vehicle;

a fuel cell (e.g., a fuel cell 1 in the embodiment);

a motor (e.g., a drive motor 32 in the embodiment) for driving the vehicle, wherein the motor is driven using electric power generated by the fuel cell, and the fuel cell, the motor, and the side frames are installed in the motor chamber; and a support frame (e.g., a support frame 60 in the embodiment) for coupling rear portions of the side frames with each other in a width direction of the vehicle, and for supporting the fuel cell installed on the support frame, wherein the motor is arranged below the support frame.

In accordance with the above structure, in the area where the support frame is formed, deformation of the vehicle is prevented when a vehicle collision occurs. Therefore, it is possible to protect the fuel cell. In addition, the fuel cell and the motor are respectively arranged on the upper and lower sides of the support frame; thus, it is possible to prevent the fuel cell from being damaged by the motor which is forced toward the fuel cell.

The fuel cell vehicle may further comprise:

a guide member (e.g., guide frames 69 in the embodiment) for guiding the motor toward a lower-back side of the support frame when a front collision of the vehicle occurs.

Accordingly, when a front collision of the vehicle occurs, the motor can be guided toward a lower-back side of the support frame; thus, it is possible to reliably prevent the fuel cell from being damaged by the motor which is forced toward the fuel cell, and to provide a desired collision stroke with respect to the front collision of the vehicle.

In a preferable example, the guide member is connected to the support frame and a tunnel part provided under a dashboard of the vehicle.

The fuel cell vehicle may further comprise:

a sub-frame, on which the motor is installed, which is arranged below the support frame in a manner such that a front end of the sub-frame is positioned more frontward than a front end of the support frame.

In a typical example, an air compressor for supplying air to the fuel cell is installed on the sub-frame.

In a side view, the support frame may be arranged within a vertical width of the side frames.

In another typical example, a high-voltage electrical equipment device is installed on the support frame.

In another typical example, a device including hydrogen for the fuel cell is installed on the support frame.

DETAILED DESCRIPTION OF THE INVENTION

Hereinafter, an embodiment in accordance with the present invention will be described with reference to the appended figures.

Figure 1:
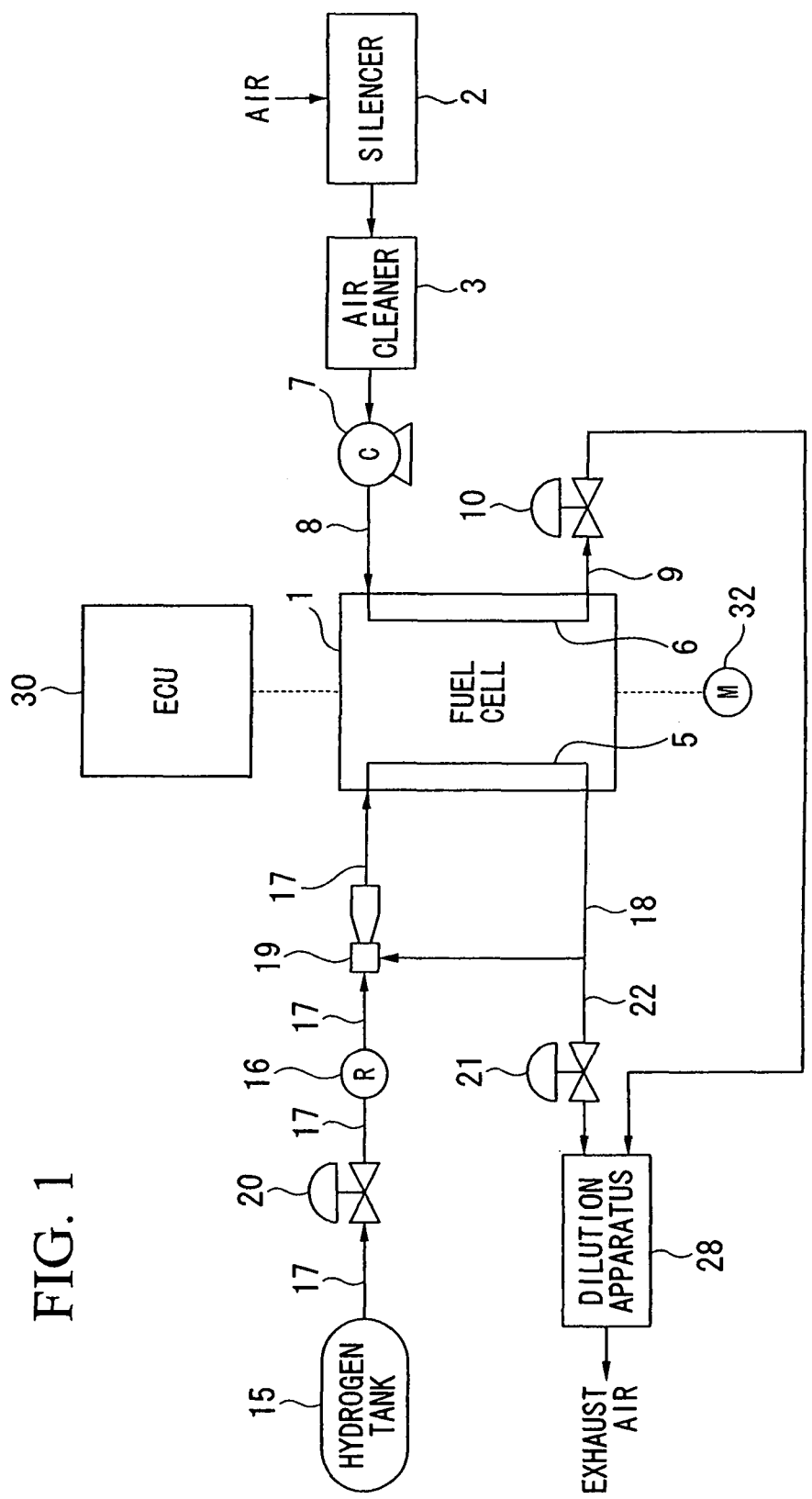
FIG. 1 is a diagram showing the general structure of a fuel cell system in a fuel cell vehicle.

FIG. 1 is a diagram showing the general structure of a fuel cell system in a fuel cell vehicle. A fuel cell 1 generates electric power by way of an electrochemical reaction between reaction gases, and may be formed by stacking a plurality of unit cells, each having a structure in which a solid polymer electrolyte membrane (e.g., a solid polymer ion-exchange film) is interposed between an anode and a cathode. Hydrogen gas as a fuel gas is supplied to a fuel gas passage 5 toward the anode, while air (i.e., including oxygen) as an oxidant gas is supplied to an oxidant gas passage 6 toward the cathode. Accordingly, hydrogen ions generated at the anode by catalytic reaction move through the solid polymer electrolyte membrane to the cathode, and an electrochemical reaction occurs between the hydrogen ions and oxygen at the cathode, thereby generating electric power in the fuel cell 1.

A drive motor 32 for driving the vehicle is driven using the power generated by the fuel cell 1. An electronic control unit (ECU) 30 controls the power generation of the fuel cell 1, based on an accelerator signal, a brake signal, or the like.

The sound generated by air which is supplied to the fuel cell 1 is reduced by a silencer 2, and impurities included in the air are removed by an air cleaner 3. The air is then compressed by an air compressor 7 (e.g., a supercharger) so as to have a specific pressure, and then passes through an air supply passage 8 so that it is supplied to the oxidant gas passage 6 in the fuel cell 1. The air supplied to the fuel cell is subjected to electric power generation, and is then discharged to an air discharge passage 9 together with water generated at the cathode. The discharged air is supplied via a pressure control valve 10 to a dilution apparatus 28.

On the other hand, the hydrogen gas supplied from a hydrogen tank 15 passes through a hydrogen gas supply passage 17 and a cutoff valve 20, and is decompressed so as to have a specific pressure that is regulated by a regulator 16. The decompressed gas then passes through an ejector 19 and is supplied to the fuel gas passage 5 in the fuel cell 1. Unreacted hydrogen gas which has not been consumed is discharged as an anode off-gas from the fuel cell 1, and then passes through an anode off-gas passage 18 to be absorbed by the ejector 19. The unreacted hydrogen gas is combined with fresh hydrogen gas supplied from the hydrogen tank 15, and the combined gas is again supplied to the fuel gas passage 5 in the fuel cell 1. That is, the anode off-gas discharged from the fuel cell 1 circulates through the fuel cell 1 via the anode off-gas passage 18, the ejector 19, and the hydrogen gas supply passage 17.

An anode off-gas discharge passage 22 is extended as a branch passage from the anode off-gas passage 18, and has a discharge valve 21 disposed therein. The discharge valve 21 is opened when necessary, for example, when the concentration of impurities (e.g., water or nitrogen) included in the hydrogen gas (which circulates through the fuel cell 1) increases, so as to discharge the anode off-gas. The anode off-gas discharged through the discharge valve 21 is diluted by the dilution apparatus 28 using a cathode off-gas, and is then discharged.

Front Structure of the Fuel Cell Vehicle

Figure 2:
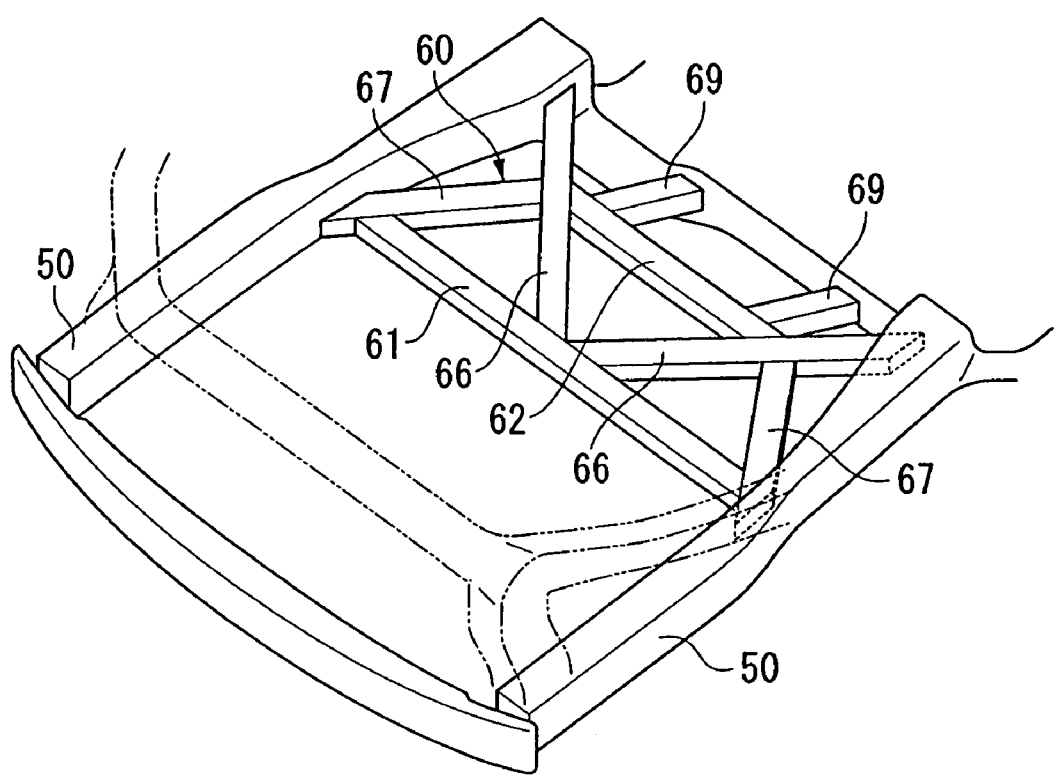
FIG. 2 is a perspective view showing the structure of a front frame structure in the fuel cell vehicle.

FIG. 2 is a perspective view showing the structure of a front frame structure in the fuel cell vehicle. The fuel cell vehicle in the present embodiment has a fuel cell support frame 60 (simply called the "support frame 60" below) for coupling rear portions of right and left side frames 50 with each other in a width direction of the vehicle, where the side frames 50 extend in a front-to-back direction of the vehicle. The support frame 60 is coupled to the side frames 50 using fastening method such as welding or bolting.

The support frame 60 includes right-to-left beams 61 and 62, each extending in a right-to-left direction of the vehicle, and oblique beams 66 and other oblique beams 67 each extending obliquely.

More specifically, the first right-to-left beam 61 is arranged toward the front of the vehicle. The first oblique beams 66 extend from a central part of the first right-to-left beam 61 toward the back on the right and left sides, and the heads of the first oblique beams 66 are coupled to the corresponding side frames 50. In addition, each of the second oblique beams 67 is obliquely extended frontward from a central part of the corresponding first oblique beam 66, and the head of each second oblique beams 67 is also coupled with the corresponding side frame 50. Both ends of the first right-to-left beam 61 are coupled to the vicinity of the heads of the corresponding second oblique beams 67. Furthermore, the second right-to-left beam 62 is provided toward the back of the vehicle, so as to couple the center portions of the first oblique beams 66 to each other. The structure of the support frame 60 is not limited to the above, and may employ any of various layout forms.

In the fuel cell vehicle of the present embodiment, a pair of guide frames 69 (i.e., a guide member) is provided for guiding the drive motor 32 toward the lower-back side of the support frame 60 when a front collision of the vehicle occurs. Each of the guide frames 69 extends downward to the back of the vehicle from a position in the vicinity of a corresponding end of the second right-to-left beam 62, and the head of each guide frame 69 is connected to a tunnel part T (see FIG. 3) under a dashboard 52 of the vehicle. The structure of the guide frames 69 is also not limited to the above, and may employ any of various beam layout forms.

Figure 3:
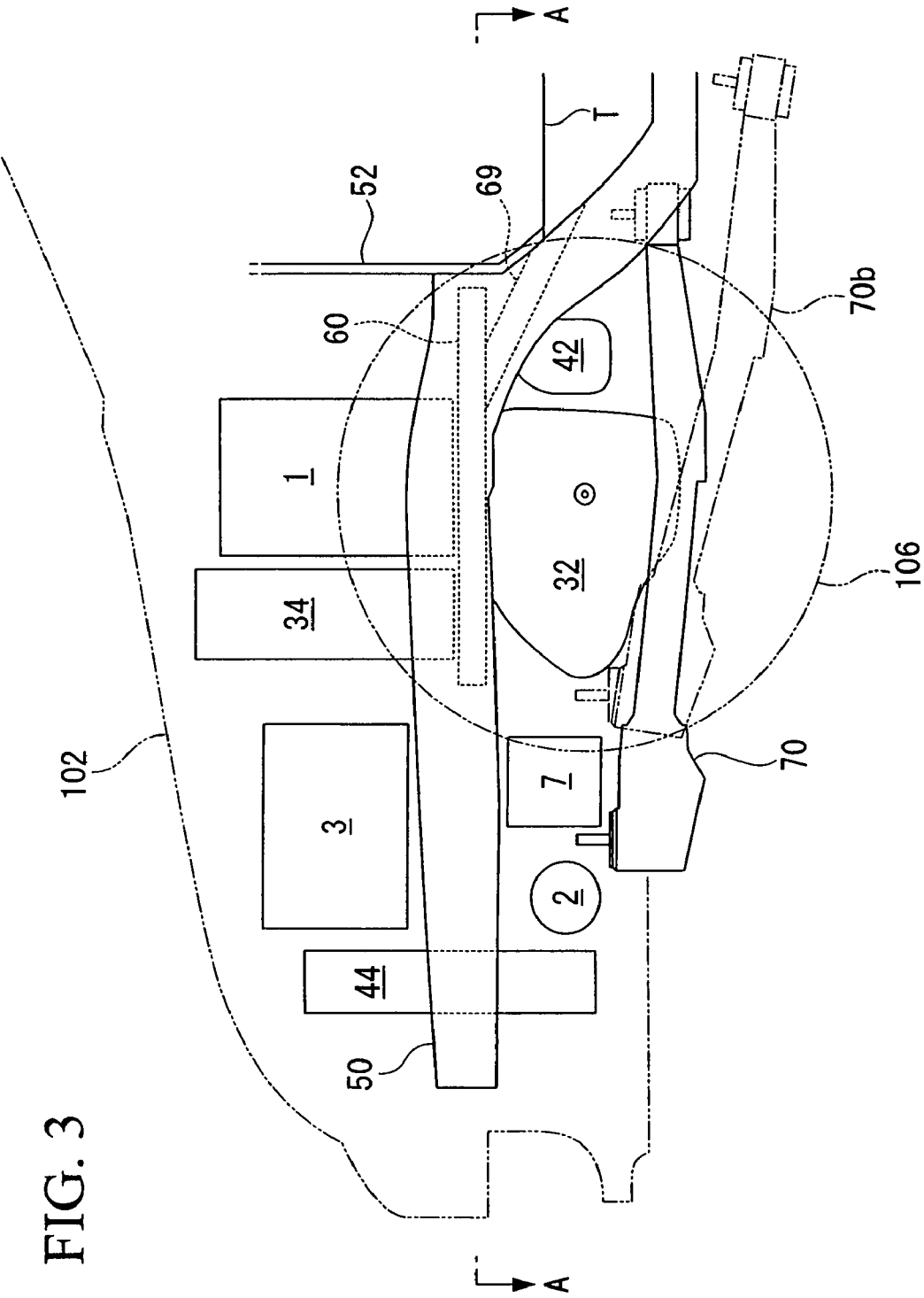
FIG. 3 is a side view of a front structure in the fuel cell vehicle.

FIG. 3 is a side view of the front structure in the fuel cell vehicle. The above-described side frames 50 are arranged horizontally in a motor chamber 102 at approximately the vertical center of the chamber, and a back end part of each side frame 50 extends along the dashboard 52 toward the bottom of the interior of the vehicle. In the side view, the above-described support frame 60 and the guide frames 69 overlap with the side frames 50.

On the upper side of the support frame 60, devices or parts are arranged, which must not be destroyed or ruptured when a vehicle collision occurs. Specifically, the above-described fuel cell 1, a high-voltage electrical equipment box 34, and the like, are arranged. The high-voltage electrical equipment box 34 includes a power drive unit (PDU), a high-voltage control unit (VCU), a DC/DC converter, and the like. The PDU controls a driving and generating operation of the drive motor 32. The VCU supplies voltages required by the PDU and the air compressor 7. The DC/DC converter controls the level of an electric current provided by a battery device (not shown) such as a high-voltage battery or a capacitor. In addition, a part or device including hydrogen (e.g., the dilution apparatus 28), used in the fuel cell system, may also be installed on the support frame 60.

On the upper-front side of the support frame 60, devices or parts are arranged, which are easily destroyed or ruptured when a vehicle collision occurs, and which thus do not obstruct the absorption of the collision energy. Specifically, the air cleaner 3 for removing impurities from the air supplied to the fuel cell 1, and the like, are arranged.

On the front side of the vehicle, a radiator 44 for cooling the water for cooling the fuel cell 1, the drive motor 32, and the like, is arranged.

Figure 4:
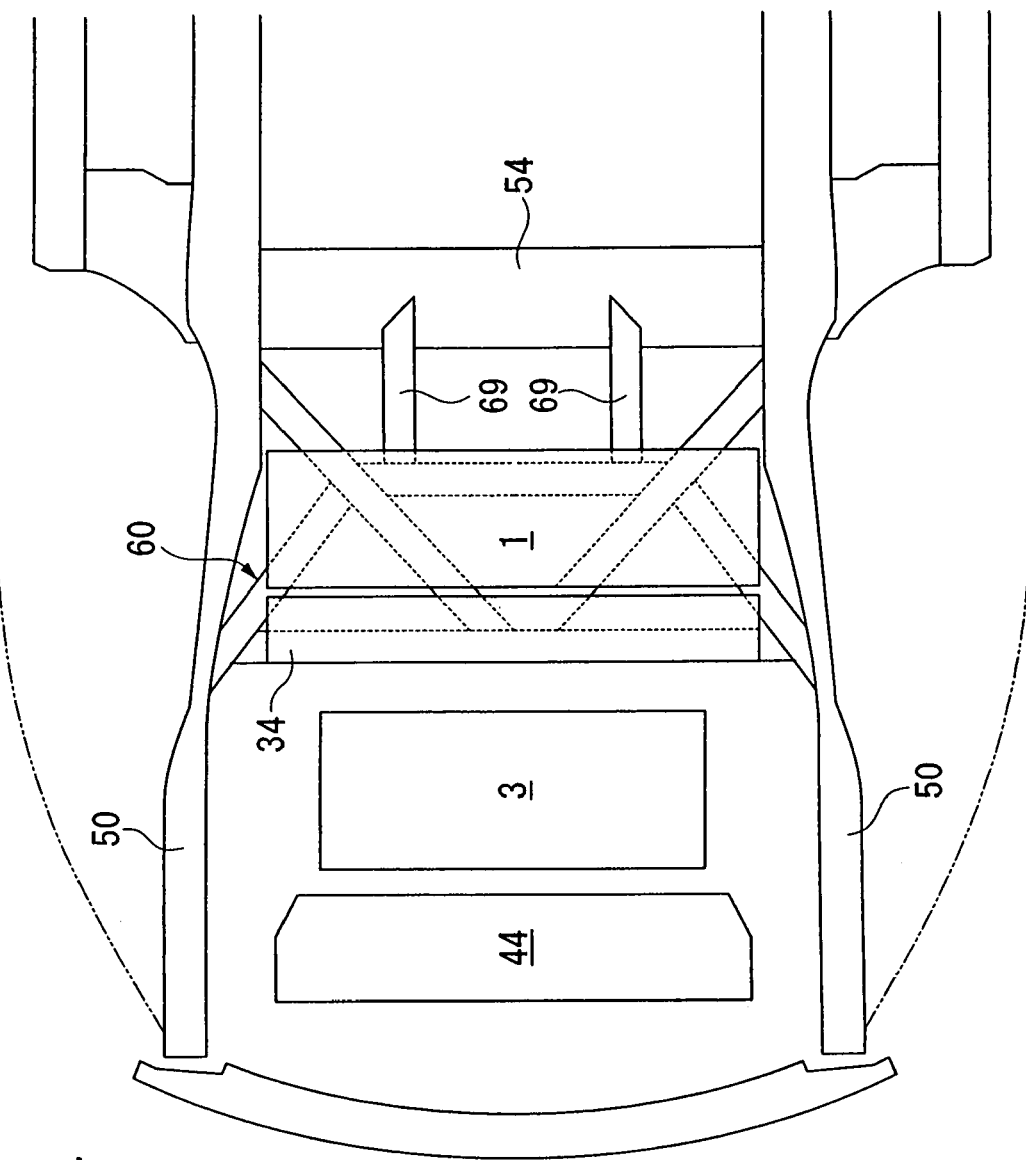
FIG. 4 is a plan view of the front structure in the fuel cell vehicle.

FIG. 4 is a plan view of the front structure in the fuel cell vehicle. As described above, the fuel cell 1 and the high-voltage electrical equipment box 34 are arranged on the support frame 60. In addition, the air cleaner 3 is arranged on the upper-front side of the support frame 60, and the radiator 44 is arranged on the front side of the vehicle.

Again with reference to FIG. 3, in the motor chamber 102 provided in the front part of the vehicle, the drive motor 32 is arranged under the support frame 60. More specifically, a sub-frame 70 is provided below the support frame 60, and devices or parts which are not easily destroyed or ruptured when a vehicle collision occurs are arranged between the sub-frame 70 and the support frame 60. Specifically, the drive motor 32 for driving wheels 106, the air compressor 7, the silencer 2, and the like, are arranged. The silencer 2 is provided so as to reduce an air supply sound produced by the air compressor 7, and exhaust sound produced by the exhaust system. A steering gear box 42 and the like are also arranged.

In the above structure, the front end of the sub-frame 70 is positioned further to the front than the front end of the support frame 60.

Figure 5:
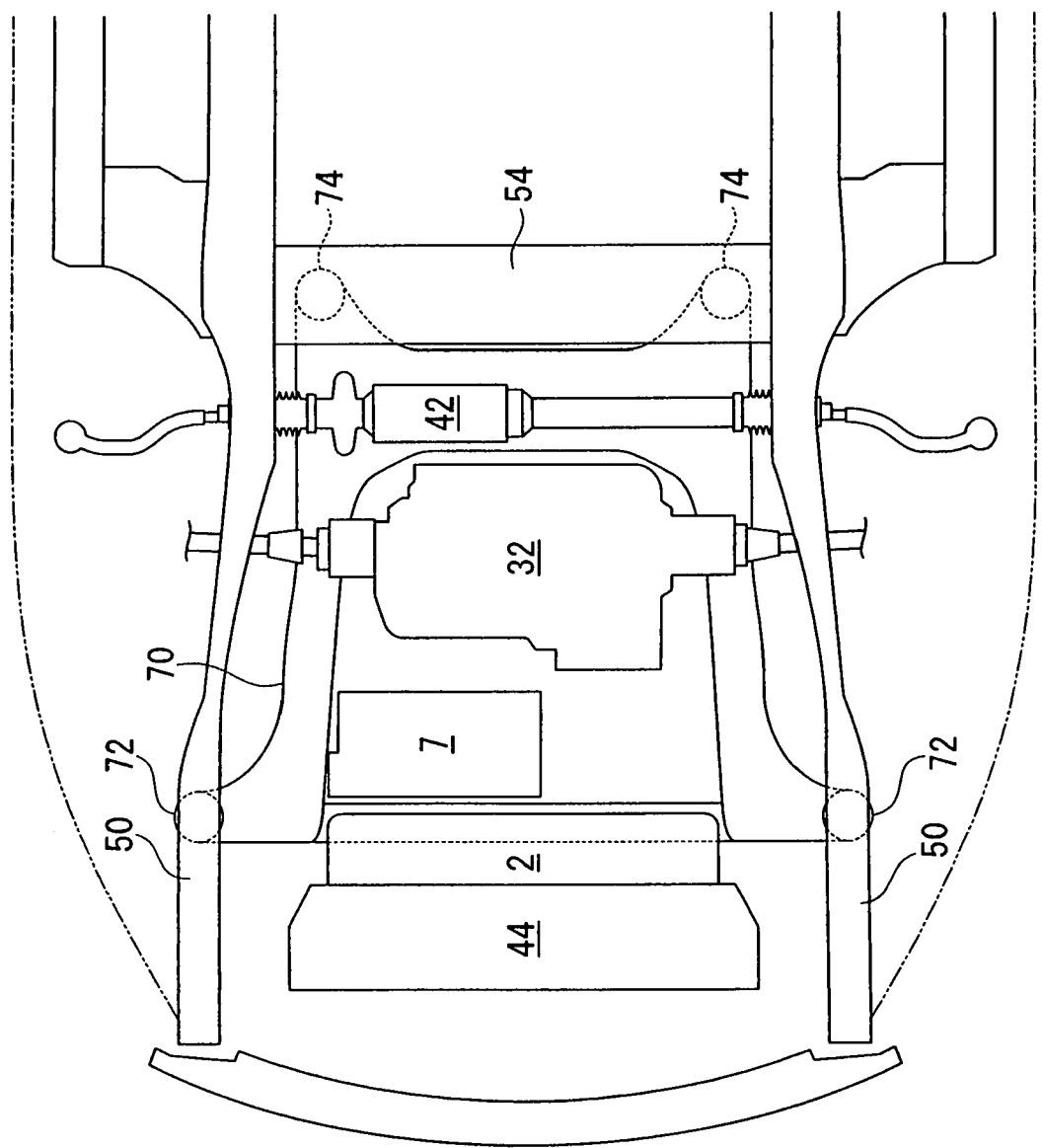
FIG. 5 is a sectional view along line A-A in FIG. 3

FIG. 5 is a sectional view along line A-A in FIG. 3, where the support frame 60 is not shown for convenience of explanation. As shown in FIG. 5, the sub-frame 70 has a rectangular shape, and is arranged on the bottom of the motor chamber 102. In the sub-frame 70, front ends 72 are connected to the corresponding side frames 50 via attachment members (not shown), while rear ends 74 thereof are connected to a cross member 54. The above-described devices such as the drive motor 32, the air compressor 7, the silencer 2, the steering gear box 42, a front suspension, and the like, are installed on the upper side of the sub-frame 70.

Again with reference to FIG. 3, in the area where the support frame 60 is provided so as to couple the side frames 50 in a width direction of the vehicle, deformation of the vehicle is prevented when a front collision of the vehicle occurs. Therefore, it is possible to protect the devices such as the fuel cell 1 and the high-voltage electrical equipment box 34, arranged on the upper side of the support frame 60, from deformation due to a front collision of the vehicle. Accordingly, it is possible to prevent hydrogen leakage from the fuel cell 1, high-voltage current leakage from the high-voltage electrical equipment box 34, and the like.

On the other hand, in the area in front of the support frame 60, the vehicle deforms when a front collision of the vehicle occurs, so as to absorb the collision energy. In this case, the devices such as the radiator 44 and the air cleaner 3, arranged on the front or upper-front side of the support frame 60, are easily destroyed when a vehicle collision occurs, and do not obstruct or prevent the absorption of the collision energy.

In accordance with the deformation of the vehicle, the sub-frame 70 arranged on the bottom of the vehicle moves toward the back of the vehicle. During this movement, the drive motor 32 installed on the sub-frame 70 is guided along the lower faces of the guide frames 69. Accordingly, the whole body including the sub-frame 70 and the devices installed thereon falls as indicated by an alternate long and two short dashed line 70b in FIG. 3, thereby providing a desired collision stroke with respect to the front collision of the vehicle.

In the present embodiment, the devices (e.g., the fuel cell 1 and the high-voltage electrical equipment box 34) which must not be destroyed or ruptured, and the devices (the drive motor 32) which are not easily destroyed or ruptured are respectively arranged on the upper and lower sides of the support frame 60. In addition, when a front collision of the vehicle occurs, the drive motor 32 and the like are guided toward the lower back of the support frame 60. Therefore, it is possible to prevent the devices such as the fuel cell 1 and the like from being damaged by the drive motor 32 or the like, when forced toward these devices when a front collision of the vehicle occurs. Accordingly, it is possible to prevent hydrogen leakage from the fuel cell 1 or high-voltage current leakage from the high-voltage electrical equipment box 34, and to provide a desired collision stroke when a front collision of the vehicle occurs.

Therefore, the front structure of the fuel cell vehicle in accordance with the present embodiment can provide safety with respect to a front collision of the vehicle.

Also in the present embodiment, the fuel cell 1 is arranged, not under the floor in the central part of the vehicle, but in the motor chamber provided in the front part of the vehicle. Therefore, an increase in the total height of the vehicle can be prevented, and the height of the interior of the vehicle can be increased. Accordingly, the present structure can be implemented by only arranging the support frame 60 between the side frames 50 which form an identical frame (or platform) to that of vehicles employing an internal combustion engine, thereby allowing provision of fuel cell vehicles at low cost. In addition, flexibility in the vehicle design and convenience for use can be improved, thereby allowing design and development of vehicles suitable for individual use.

Furthermore, the support frame 60 couples the rear portions of the side frames 50 (which extend in the front-to-back direction) in a width direction of the vehicle, thereby improving torsional rigidity of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the motor chamber may include structural elements of the fuel cell system, other than those described above. In addition, it is unnecessary to provide all of the structural elements of the fuel cell system in the motor chamber, and some of the structural elements may be arranged under the floor in the central part of the vehicle, or in a rear part pf the vehicle.

What is claimed is:

1. A fuel cell vehicle comprising:

a motor chamber provided in a front part of the vehicle;

side frames extending on right and left sides of the vehicle in a front-to-back direction of the vehicle;

a fuel cell;

a motor for driving the vehicle, wherein the motor is driven using electric power generated by the fuel cell, and the fuel cell, the motor, and the side frames are installed in the motor chamber;

a support frame for coupling rear portions of the side frames with each other in a width direction of the vehicle, and for supporting the fuel cell installed on the support frame, wherein the motor is arranged below the support frame;

a guide member for guiding the motor toward a lower-back side of the support frame when a front collision of the vehicle occurs, wherein: a front portion of the guide member is connected to the support frame and the guide member extends rearwardly downward to a position beneath a dashboard of the vehicle; and a sub-frame, on which the motor is installed, which is arranged below the support frame in a manner such that a front end of the sub-frame is positioned more frontward than a front end of the support frame, wherein the sub-frame is movable toward the back of the vehicle in accordance with a deformation of the vehicle due to a front collision thereof so that the sub-frame and the motor are moved toward a lower-back side of the vehicle with guidance of the guide member.

2. The fuel cell vehicle in accordance with claim 1, wherein:
the guide member is connected to the support frame and a tunnel part provided under a dashboard of the vehicle.

3. The fuel cell vehicle in accordance with claim 1, wherein:
an air compressor for supplying air to the fuel cell is installed on the sub-frame.

4. The fuel cell vehicle in accordance with claim 1, wherein:
in a side view, the support frame is arranged within a vertical width of the side frames.

5. The fuel cell vehicle in accordance with claim 1, wherein:
a high-voltage electrical equipment device is installed on the support frame.

6. The fuel cell vehicle in accordance with claim 1, wherein:
a device including hydrogen for the fuel cell is installed on the support frame.

* * * * *